No. 613,362. Patented Nov. 1, 1898.
E. L. DITHRIDGE.
PAN FOR HEATING AND APPLYING CEMENT.
(Application filed Nov. 13, 1897.)
(No Model.)
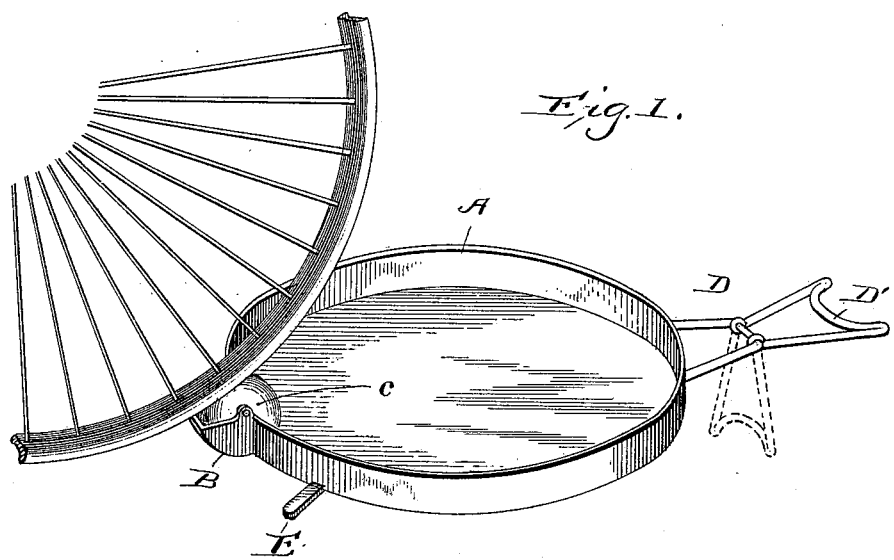
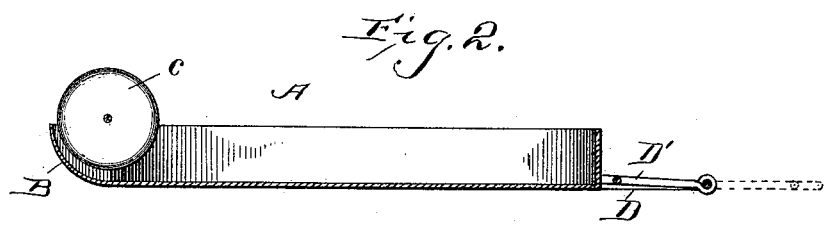
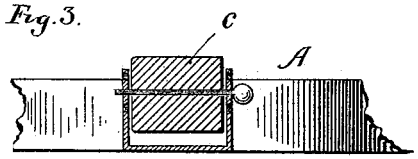

UNITED STATES PATENT OFFICE.

EDWARD LEWIS DITHRIDGE, OF NEW YORK, N. Y.

PAN FOR HEATING AND APPLYING CEMENT.

SPECIFICATION forming part of Letters Patent No. 613,362, dated November 1, 1898.

Application filed November 13, 1897. Serial No. 658,418. (No model.)

*To all whom it may concern:*

Be it known that I, EDWARD LEWIS DITHRIDGE, a citizen of the United States, residing at New York, in the county of New York and State of New York, have invented certain new and useful Improvements in Pans for Heating and Applying Cement; and I do hereby declare the following to be a full, clear, and exact description of the invention, such as will enable others skilled in the art to which it appertains to make and use the same.

The invention relates to pans for heating and applying cement, especially for applying cement to the rim of the wheel of a bicycle for securing the tire.

The objects of the invention are to provide a peculiarly-constructed pan that will present the greatest heating-surface and from which the cement may be entirely used, so as to leave no waste.

The operator is also free to use both hands in manipulating the rim and tire of the wheel by means of the invention, the structure and mode of operation of which I will now proceed to describe.

Referring to the drawings forming a part of this specification and on which like letters of reference indicate corresponding parts, Figure 1 is a perspective view of the invention, showing a wheel to the rim of which the cement is to be applied. Fig. 2 is a vertical central section. Fig. 3 is a sectional view showing the vertical adjusting means.

A is the pan for containing the cement, and it is of suitable metal, formed quite broad and relatively shallow, so as to present the greatest extent of heating-surface, so that the cement may be quickly heated. It is preferably round or circular in general outline, although the form is not material, and it may be of any shape adapted for the purpose.

At one side of the shallow pan A is provided a spout or mouth B. The spout or mouth B is exterior to the circumference of the pan proper, and it extends from the top to the bottom thereof and comprises three vertical walls and a bottom part, the latter being practically on the plane of the bottom of the pan. The side of the spout or mouth is open toward the body of the pan, and the contents of the pan are partially contained in the spout or mouth, whose bottom part is preferably curved, as shown in the drawings.

A wheel C, with a convex periphery or substantially of a shape the reverse of the rim-surface, to which the cement is to be applied, is pivoted across the mouth or spout and is of a diameter to reach nearly to the bottom of the spout, and thus readily take up the liquid cement. The wheel may be made vertically adjustable, if desired, by having two or more holes for the axis of the wheel, which then would be made to fit the aperture through the center of the wheel loosely but snugly.

A handle D is provided at the bottom of the pan at a point diametrically opposite the spout. The handle D may be a rigid one, properly secured to the bottom of the pan, and it may be provided with a short section D', forming a foot-rest, which is hinged to the rigid section and adapted to be swung over and on top of the rigid part when the handle is designed to be used to move the pan from place to place or to be turned on its hinge or pivot in a reverse direction, and thus form a short foot or lever when the handle is to be used for tilting the pan, as will be presently explained.

Short lateral arms E may be secured to the pan at or near the bottom at the spout side, if desired, to prevent tilting of the pan sidewise when in use. I have represented this construction in Fig. 1.

The periphery of the cement-applying wheel is shown and described as convex; but it is evident that it might be concave or plain if it should be used to coat or cement a plain or convex surface.

The mode of using the pan is as follows, viz: A suitable quantity of cement is placed in the pan, which cement is heated and liquefied by a proper medium. The relatively broad and shallow form of the pan facilitates this operation by exposing a broad heating-surface. When the cement is hot, the pan is placed on the floor or ground and held firmly by means of the operator's foot resting on the handle D. The concave surface of the rim of the bicycle-wheel is brought into contact with the convex surface of the cement-applying wheel, and by rotating the large wheel the cement-wheel is rotated by friction, and during its rotation it takes up the cement from the pan and applies it to the concave rim. As the cement is gradually used up or until but a small quantity remains in the pan the pan is tilted at the handle side, and what cement remains runs into the spout or mouth, where it is readily taken up by the wheel. I am thus enabled not only to economize in cement by heating a smaller quantity than usual, but by tilting the pan when the supply is nearly exhausted I can use all that has been heated and avoid waste, leaving the pan clean for subsequent use. By means of the handle at the bottom of the pan the operator's hands are also left free to manipulate the rim to which the cement is to be applied, since the pan can be held firmly as well as tilted by the foot of the operator.

The arms at the spout side of the pan prevent tilting laterally, as already explained.

Minor changes in the details of structure may be made within the scope of the invention without departing from the spirit or sacrificing any of the advantages thereof.

Having thus fully described the invention, what I claim as new, and desire to secure by Letters Patent, is—

1. A cement-pan formed with a relatively broad bottom and shallow sides, with a spout or mouth at one side extending from the top to the bottom of the pan, a cement-applying wheel mounted in the spout or mouth and a handle at the bottom of the pan at the opposite side, substantially as described.

2. A cement-pan formed with a relatively broad bottom and shallow sides, with a spout or mouth at one side extending from the top to the bottom of the pan, a vertically-adjustable cement-applying wheel mounted in the spout or mouth, and a handle at the bottom of the pan on the opposite side, substantially as described.

3. A cement-pan with a relatively broad bottom and shallow sides, with a spout or mouth at one side extending from the top to the bottom of the pan, a cement-applying wheel mounted in the spout or mouth, a handle and a foot-rest pivoted thereto at the bottom of the pan at the opposite side, substantially as described.

In testimony whereof I affix my signature in presence of two witnesses.

EDWARD LEWIS DITHRIDGE.

Witnesses:
WILLIAM H. MURRAY,
A. H. VAN ZANDT.